G. C. HAIGHT.
Wheel-Plows.

No. 148,448.             Patented March 10, 1874.

WITNESSES.                          INVENTOR,

Henry N. Miller        George C. Haight,
C. L. Evest,           By Alexander Mason
                                        Attorneys.

AM.PHOTO-LITHOGRAPHIC Co.N.Y.(OSBORNE'S PROCESS.)

UNITED STATES PATENT OFFICE

GEORGE C. HAIGHT, OF NEWARK, WISCONSIN.

IMPROVEMENT IN WHEEL-PLOWS.

Specification forming part of Letters Patent No. 148,448, dated March 10, 1874; application filed September 8, 1873.

*To all whom it may concern:*

Be it known that I, GEORGE C. HAIGHT, of Newark, in the county of Rock and in the State of Wisconsin, have invented certain new and useful Improvements in Wheel-Plows; and do hereby declare that the following is a full, clear, and exact description thereof, reference being had to the accompanying drawings and to the letters of reference marked thereon, making a part of this specification.

The nature of my invention consists mainly in the construction and arrangement of the truck or sulky, and in the means for attaching the plow-beam to the same, as will be hereinafter more fully set forth.

In order to enable others skilled in the art to which my invention appertains to make and use the same, I will now proceed to describe its construction and operation, referring to the annexed drawings, in which—

Figure 1:
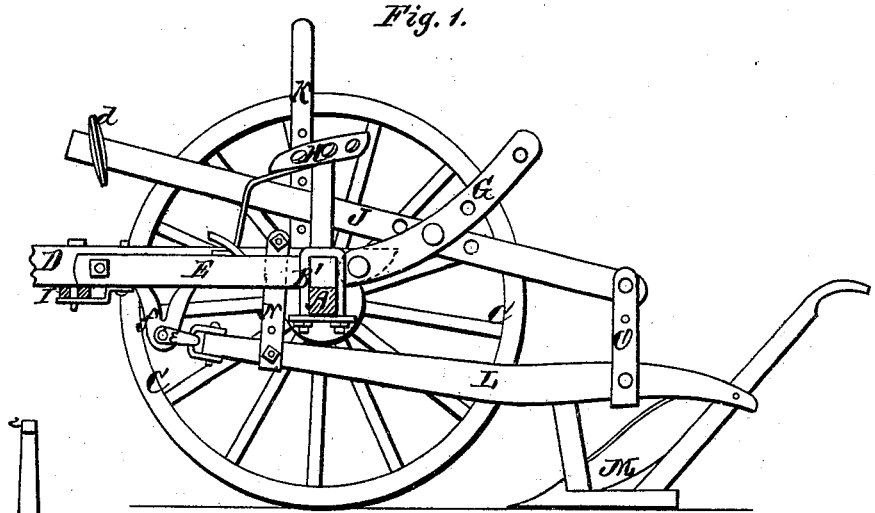
Figure 2:
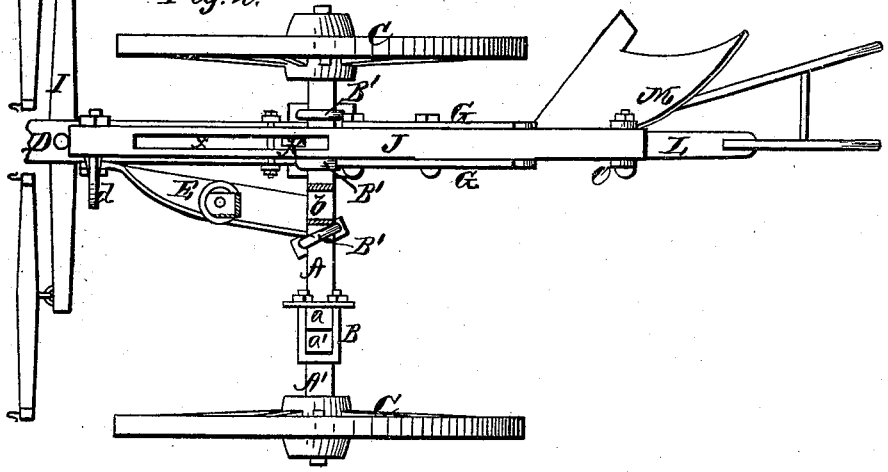
Figure 3:
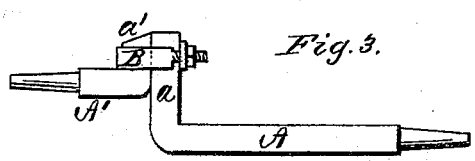

Figure 1 is a sectional side elevation, and Fig. 2 a plan view, of my plow. Fig. 3 shows the construction of the axle.

A A' represent the axle of my plow, made in two parts, as shown in Fig. 3. The main or larger part A of the axle has a spindle at the outer end, and the inner end $a$ is bent upward at right angles. The smaller part A' of the axle has also a spindle at its outer end, and the inner end $a$ is also bent upward at right angles. The two ends $a$ $a'$ of the two parts A A' are then firmly connected together by means of a clip or clamp, B. By this means, when the wheels C C are placed on the spindles of the axle, the part A' may be raised or lowered at will, so as to allow one of the wheels to run in the furrow already plowed, while the other is on the ground, and still keep the truck or sulky level; or the two parts of the axle may be coupled together on a line with each other when both wheels are to run on the ground. D represents the tongue, to the side of which is secured a brace, E, and both tongue and brace placed on top of part A of the axle, and secured by a metal strap, $b$, and clips B' B'. H represents the driver's seat, which is supported by suitable standards from the brace E. I is the double-tree, provided with suitable single-trees, and attached, at a convenient point, to the under side of the tongue. To the rear end of the tongue D, immediately in rear of the axle, are firmly secured two curved metal bars, G G, which extend backward and upward, as shown in Fig. 1, and between these bars is pivoted a lever, J. This lever may be changed up or down, and forward or backward, as occasion may require, by removing the bolt which pivots it, there being for this purpose several holes through both the bars and the lever. At the front end of the lever J is a foot-piece, $d$, upon which the driver may place his foot to operate the lever, the same thus forming a foot-lever. In the foot-lever J is a longitudinal slot, $x$, through which passes a standard, K, from the tongue D, said standard being perforated for the passage of a pin or key to hold the foot-lever stationary at any desired height. This completes the truck or carriage to which the plow is to be attached. L represents the plow-beam, with plow M, constructed in any of the known and usual ways. The front end of the plow-beam L is, by a chain or clevis, $e$, attached to an iron or brace, $f$, projecting downward from the tongue D. The beam L is further suspended from the tongue by means of a stirrup, N, and the rear end of the plow-beam is, by another stirrup, O, connected with the rear end of the foot-lever J, thus forming a stiff connection for the beam with the carriage, to prevent the lateral swaying of the beam.

The driver can readily raise or lower the plow, as desired, by means of the foot-lever; and when said lever is made stationary, as above mentioned, the plow is held in one position, so as to make a furrow of uniform depth.

I do not broadly claim a wheel-plow in which one or both wheels can be adjusted up or down on the axle, as I am aware such is not new.

Having thus fully described my invention, what I claim as new, and desire to secure by Letters Patent, is—

1. The combination, with the wheels C C, of the axle composed of the long arm A, with its inner ends $a$ bent upward, the short arm A', with its inner end $a'$ bent upward, and the two upward-bent ends $a$ $a'$, secured together by the stirrup-clamp B and its nuts, all as shown in Fig. 3, for the purposes set forth.

2. The combination of the axle A A', wheels C C, tongue D, brace E, clips B B', curved bars G G, and foot-lever J, all constructed and arranged substantially as and for the purposes herein set forth.

3. The combination of the axle A A', wheels C C, tongue D, brace E, clips B B', curved bars G G, foot-lever J, stirrups N O, and beam L, all constructed and arranged substantially as and for the purposes herein set forth.

In testimony that I claim the foregoing I have hereunto set my hand this 19th day of August, 1873.

GEORGE C. HAIGHT.

Witnesses:
 R. TATTERSHALL,
 P. JOHNSON.